J. CHODAKOWSKI.
AEROPLANE.
APPLICATION FILED JULY 27, 1916.
1,238,264.
Patented Aug. 28, 1917.
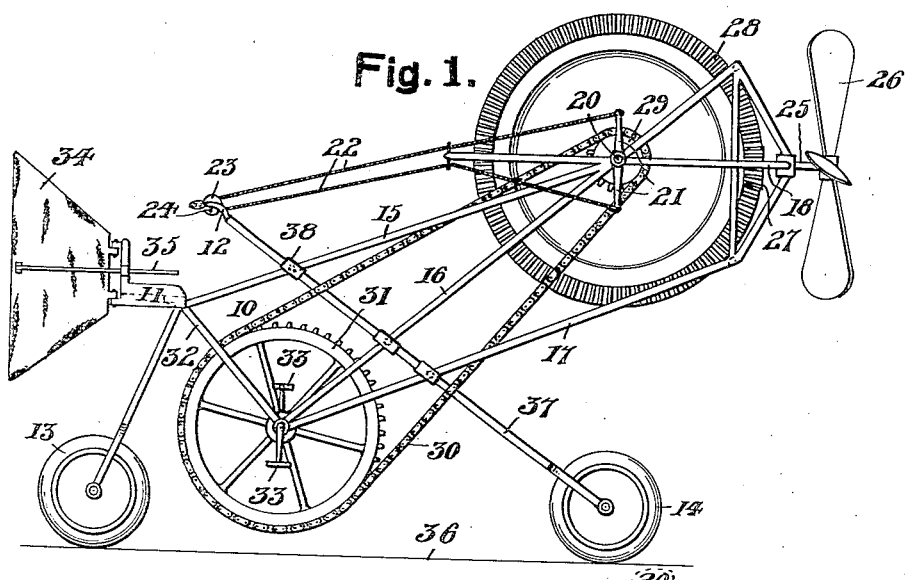
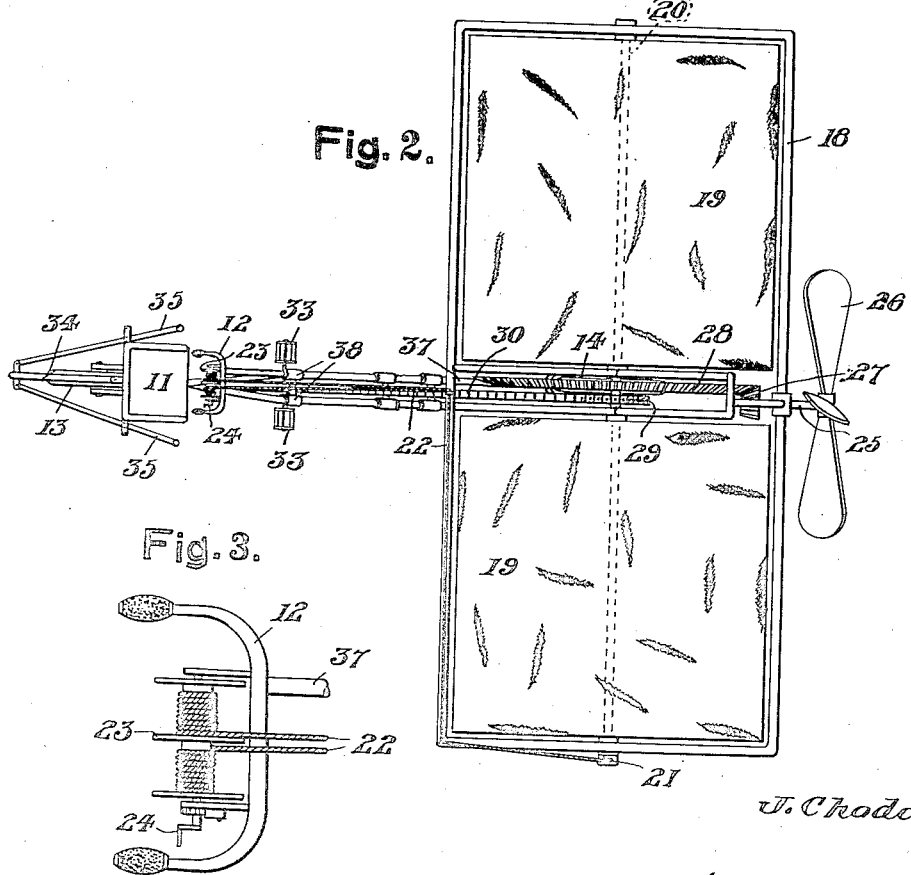
Inventor
J. Chodakowski
By A. M. Wilson,
Attorney.

UNITED STATES PATENT OFFICE.

JAN CHODAKOWSKI, OF BINGHAMTON, NEW YORK.

AEROPLANE.

1,238,264.   Specification of Letters Patent.   Patented Aug. 28, 1917.

Application filed July 27, 1916.   Serial No. 111,633.

*To all whom it may concern:*

Be it known that I, JAN CHODAKOWSKI, a subject of the Czar of Russia, residing at Binghamton, in the county of Broome and State of New York, have invented certain new and useful Improvements in Aeroplanes, of which the following is a specification.

This invention relates to certain new and useful improvements in aeroplanes.

The primary object of the invention is the provision of a device primarily designed as a glider being manually propelled whereby a person may skim over the ground and at times being slightly elevated thereabove.

A further object of the device is to provide a vehicle operable by an air propeller for moving lightly over the surface of the ground as well as for sailing through the air for short distances, the device being provided with suitable steering devices.

With these general objects in view and others that will appear as the nature of the invention is better understood, the same consists in the novel construction, combination and arrangement of parts hereinafter more fully described, illustrated in the accompanying drawings and then claimed.

In the drawings forming a part of this application and in which like designating characters refer to corresponding parts throughout the several views:—

Figure 1 is a side elevation of the device.

Fig. 2 is a top plan view thereof, and,

Fig. 3 is an enlarged top plan view of the handle bars and accompanying mechanism.

It being understood that the present device is designed for movement both through the air and upon the ground, the same provides a frame 10 having a driver's seat 11, handle bars 12, and rear and front wheels 13 and 14 respectively, substantially after the manner of a bicycle.

A rectangular frame 18 is mounted substantially over the front wheel 14 of the device by means of connecting braces 15, 16 and 17. Two elevating planes 19 are mounted in the frame 18 by means of an axle 20 longitudinally journaled upon the frame 18. Opposite arms 21 are carried by one projecting end of the axle 20 being arranged with separate cords 22 attached to the free ends of the said arms and wound in opposite directions upon a double winding drum 23 having a turn crank 24 and positioned upon the handle bar 12. By this arrangement the planes 19 may be tilted as desired by turning the crank 24 in either required direction.

A propeller shaft 25 forwardly projects centrally from the frame 18 having an operating propeller 26 upon its forward end and a pinion 27 upon its rear end arranged inwardly of the said frame. A beveled driving gear 28 is centrally journaled upon the axle 20 being in constant mesh with the pinion 27 and provided with a sprocket wheel 29 over which a chain 30 is arranged carried by a relatively larger sprocket wheel 31 journaled at the rear connections of the braces 16 and 17 where the same are attached to the central depending brace or backbone 32 of the frame 10. Pedals 33 are carried by the wheel 31 whereby the operator positioned upon the seat 11 may turn the sprocket wheels 31 and 29, thereby revolving the gear 28, pinion 24 and propeller 26.

A rudder or steering plane 34 is pivotally mounted rearwardly of the seat 11 being arranged with suitable pull rods 35 for shifting the rudder in a desired direction for steering the device.

It will be understood that by operating the propeller 26, the device is drawn forward over the ground 36 upon the wheels 13 and 14, the mounting rod 37 of the front wheel 14 being preferably journaled in the struts 15 and 17 by means of collars 38 whereby the device may be steered along the ground by means of the handle bar 12, although the rudder 34 is also serviceable in the steering operation. Upon gaining sufficient speed, the planes 19 may be suitably tilted upwardly by operating the drum 23, allowing the propeller 26 to elevate the device in the air after the nature of a glider or aeroplane, the steering at such times being accomplished by means of the rudder 34 and the flight of the device through the air being also controlled by the manipulation of the planes 19. The device provides a conveyance of light weight manually operable for traveling at great speeds part of the time through the air and at other times along the ground.

What I claim as new is:—

An aeroplane of the glider type, including a bicycle-type of frame, and carrying a rectangular frame mounted substantially over the front wheel of the first-referred to frame by means of connecting braces between said frames, said rectangular frame having arranged therein planes mounted upon a shaft journaled in said frame, said shaft having one end provided with oppositely projecting arms, a rotary winding element, said oppositely projecting arms having attached thereto separate flexible connections reversely wound upon said rotary winding element, a propeller with its shaft projecting forwardly and centrally from said rectangular frame, said propeller shaft having a propeller upon one end, a pinion upon its opposite end, and a beveled driving gear centrally journaled on the first mentioned shaft and in constant mesh with said pinion, a chain belt encompassing a sprocket-wheel upon the first mentioned shaft and a sprocket-wheel upon the pedal-shaft of said bicycle-frame, a mounting rod carrying the front wheel of said bicycle frame, and collars, carried by connecting braces between said bicycle-frame and rectangular frame, in which collars is journaled said mounting rod, and means for actuating said rotary winding element.

In testimony whereof I affix my signature.

JAN CHODAKOWSKI.